United States Patent
Gao

(10) Patent No.: US 10,044,301 B2
(45) Date of Patent: Aug. 7, 2018

(54) PROVIDING A MOTOR INTERFACE COMPATIBLE WITH MULTIPLE MOTOR TYPES

(71) Applicant: Emerson Electric Co., St. Louis, MO (US)

(72) Inventor: Sufang Gao, Jiangsu (CN)

(73) Assignee: Emerson Electric Co., St. Louis, MO (US)

( * ) Notice: Subject to any disclaimer, the term of this patent is extended or adjusted under 35 U.S.C. 154(b) by 28 days.

(21) Appl. No.: 15/275,777

(22) Filed: Sep. 26, 2016

(65) Prior Publication Data

US 2018/0091071 A1    Mar. 29, 2018

(51) Int. Cl.
*H02P 9/30* (2006.01)
*H02P 6/14* (2016.01)

(52) U.S. Cl.
CPC ...................................... *H02P 6/14* (2013.01)

(58) Field of Classification Search
CPC .. H02P 9/307; H02P 27/14; H02P 7/20; H02P 7/28; H02J 2001/008; H02J 3/005; H02J 7/0055; H02M 3/00
See application file for complete search history.

(56) References Cited

U.S. PATENT DOCUMENTS

| | | | | |
|---|---|---|---|---|
| 5,563,782 A * | 10/1996 | Chen | ................. | H01R 13/6675 363/146 |
| 5,744,925 A * | 4/1998 | Madsen | ............ | B60H 1/00835 318/264 |
| 6,170,241 B1 * | 1/2001 | Shibilski | ............. | H02H 7/0833 318/434 |
| 9,178,447 B2 | 11/2015 | Broker et al. | | |
| 2011/0191502 A1 * | 8/2011 | Zhao | ........................ | G06F 3/00 710/10 |
| 2014/0225455 A1 * | 8/2014 | Erwin | .................... | G05D 23/19 307/109 |
| 2014/0265957 A1 | 9/2014 | Hu et al. | | |
| 2015/0077035 A1 | 3/2015 | Zhao | | |
| 2015/0145457 A1 * | 5/2015 | Broker | ..................... | H02P 6/00 318/472 |

* cited by examiner

*Primary Examiner* — Bickey Dhakal
(74) *Attorney, Agent, or Firm* — Harness, Dickey & Pierce, P.L.C.; Anthony G. Fussner

(57) ABSTRACT

Disclosed are exemplary embodiments of systems and methods for providing a motor interface compatible with multiple motor types. In an exemplary embodiment, a motor control interface circuit generally includes a solid-state switching device controllable to switch a DC voltage from a DC voltage source to provide a signal at a tap of a motor. A normalizing circuit is provided between the DC voltage source and the tap, the normalizing circuit having a clamping device configured to limit a voltage of the signal provided at the tap to an interface voltage level predefined for driving a plurality of motor types having different interface voltage ranges.

17 Claims, 4 Drawing Sheets

PROVIDING A MOTOR INTERFACE COMPATIBLE WITH MULTIPLE MOTOR TYPES

FIELD

The present disclosure relates to providing a motor interface compatible with multiple motor types.

BACKGROUND

This section provides background information related to the present disclosure which is not necessarily prior art.

Heating, ventilating and air-conditioning (HVAC) systems are used to regulate the environment within an enclosed space. An air blower typically is used to pull air from the enclosed space into the HVAC system and then push the air back into the enclosed space after conditioning the air. Blowers are used, e.g., in various heating, cooling and dehumidifying systems.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
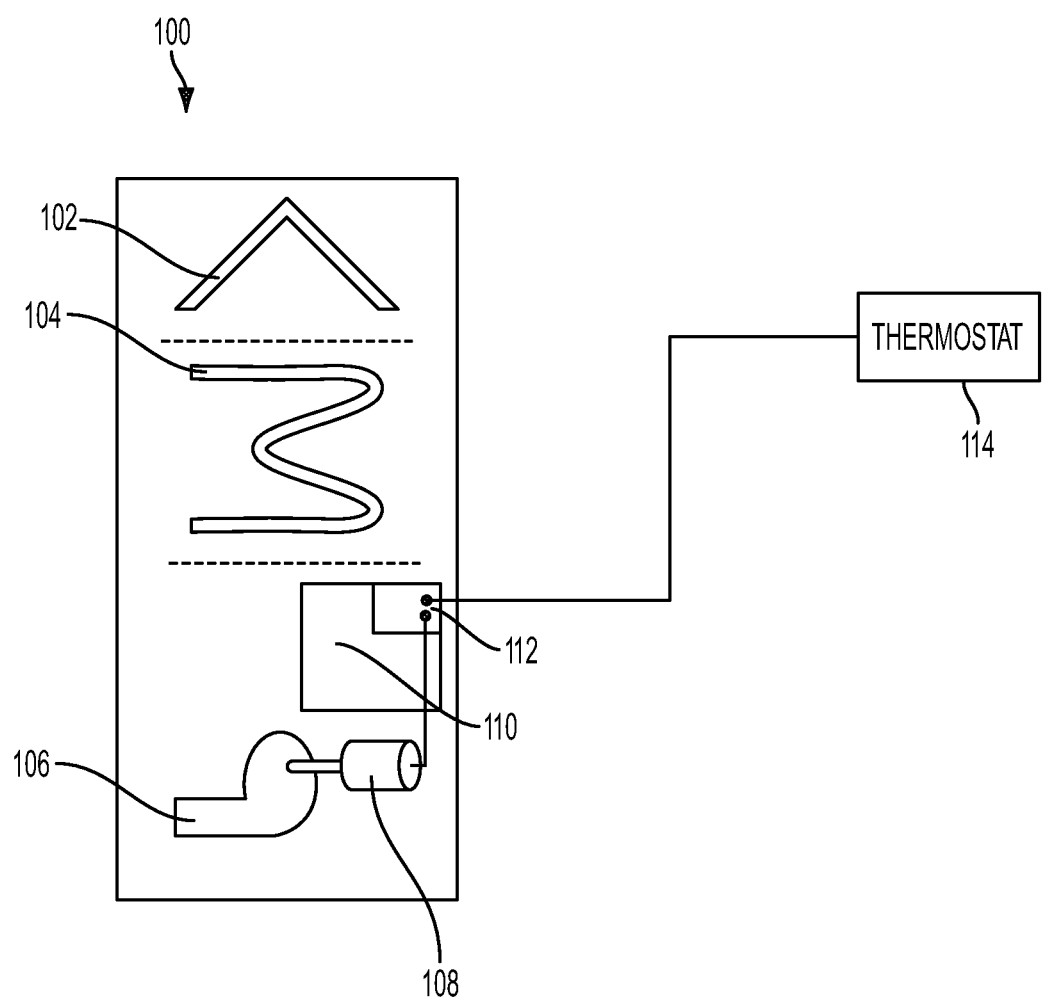
FIG. 1 is a diagram of an example HVAC system in accordance with various embodiments of the disclosure.

Example embodiments will now be described more fully with reference to the accompanying drawings.

Electronically commutated motors (ECMs) are commonly used as blower motors in the HVAC industry. Constant-torque ECMs are often used, e.g., in furnace control systems. One such motor is an X13® ECM manufactured by Regal-Beloit Corporation of Fort Wayne, Ind. (herein referred to as "Regal-Beloit ECM"). The Regal-Beloit ECM has five input ports each representing a different speed. Another type of motor similar to the Regal-Beloit ECM is one manufactured by Zhongshan Broad-Ocean Motor Co., Ltd., of Zhongshan, Guangdong Province, China (herein referred to as "Broad-Ocean ECM"). The Broad-Ocean ECM also has five input ports each representing a different speed.

Both the Regal-Beloit ECM and the Broad-Ocean ECM are capable of accepting either an AC voltage signal or a DC voltage input for speed selection via the motor speed taps (motor coil taps). Control interface circuits that have been used to apply an AC signal to a motor tap generally have included expensive mechanical relays and/or bulky switches. Reference is made to U.S. Pat. No. 9,178,447 assigned to the assignee hereof, the disclosure of which is incorporated herein by reference. Disclosed in U.S. Pat. No. 9,178,447 is a less costly transistor circuit that may be used to apply DC voltage to a tap, e.g., of an ECM, thereby making it possible to eliminate mechanical relays and switches.

The Regal-Beloit ECM and the Broad-Ocean ECM have different DC voltage ranges applicable to the speed taps in the motors. Specifically, the Broad-Ocean ECM has a DC interface voltage range of between 20 and 36 VDC, whereas the Regal-Beloit ECM has a somewhat lower DC interface voltage range of between 15 and 29 VDC. Because the internal controls of a given motor are configured to operate relative to a given interface voltage range, a control interface circuit appropriate for operating one motor might not be appropriate for operating another motor that has a different interface voltage range.

Accordingly, the inventor has developed and discloses herein exemplary embodiments of a motor control interface circuit having a first solid-state switching device controllable to switch a DC voltage from a DC voltage source to provide a signal at a tap of a motor, and a normalizing circuit provided between the DC voltage source and the tap. The normalizing circuit includes a clamping device configured to limit a voltage of the signal provided at the tap to an interface voltage level predefined for driving a plurality of motor types having different interface voltage ranges. In one example embodiment, a control interface circuit for providing a transistor output to a motor can be used to control an ECM made, e.g., by either Regal-Beloit or Broad-Ocean. In various embodiments, a control interface circuit is provided that is capable of normalizing DC voltage to speed taps for a plurality of types of motors. Such a control interface circuit is capable of using DC voltage to drive any of a plurality of motor types without potentially damaging controls internal to the motors, even where the motors accept different interface voltage ranges.

With reference now to the figures, FIG. 1 illustrates an exemplary embodiment of a heating, ventilation, and air-conditioning (HVAC) system 100 embodying one or more aspects of the present disclosure. As used herein, HVAC refers generally to any system providing climate control and may include a cooling system, a heating system, a humidifier system, a fan-only system, or any combination of heating, cooling, humidifying and/or fan operation. The exemplary HVAC system 100 includes an evaporator coil 102 to cool air passing through the system 100, a heat exchanger 104 to heat air passing through the system 100, and a blower 106 to move air through a particular space. The space may include, for example, a residence, a commercial building, or any other space in which one or more environmental conditions are to be controlled.

The blower 106 is coupled to and driven by a motor 108. The HVAC system 100 further includes an indoor control board 110, which is or includes, for example, an integrated furnace control and/or an air handler control. In various embodiments the indoor control board 110 controls the HVAC system 100, including the evaporator coil 102, the heat exchanger 104, and the blower 106. The HVAC system 100 also includes a control interface circuit 112. In some embodiments, the control interface circuit 112 is integrated in the indoor control board 110. In some other embodiments, a control interface circuit may be included, alone or in combination with one or more other circuits, elsewhere in the HVAC system 100.

A thermostat 114 is coupled to the indoor control board 110. The thermostat 114 typically provides a user interface by which a user may control temperature of the particular space and other aspects of the HVAC system 100. The thermostat 114 and/or the indoor control board 110 may issue demands or calls to cause the HVAC system 100 to operate in various modes and/or according to various routines. The control interface circuit 112 controls the motor 108 in response to signals from the thermostat 114 and/or indoor control board 110. A call from the thermostat 114 may cause the HVAC system 100 to operate according to one or more modes, e.g., single- or multi-stage heating, single- or multi-stage cooling, fan only, etc. Calls may include a corresponding demand for the motor 108 to operate according to a particular operating parameter, which, in the present example embodiment, corresponds to a particular amount of air circulation, e.g., in cubic feet per minute (CFMs).

The motor 108 is capable of operating at different speeds given a particular HVAC setting. Specifically, the motor 108 includes multiple input taps, for different speeds and/or torques corresponding to different operating parameters. For example, the control interface circuit 112 may apply a first direct current (DC) signal to energize one tap to cause the motor 108 to operate at one speed, and may apply a second DC signal to energize another tap to cause the motor 108 to operate at a different speed. The blower motor 108 may operate at a lower speed to circulate less air in a heating mode and/or at a higher speed to circulate more air in a cooling mode. If the HVAC system 100 is a two stage system, there may be two different blower speeds for different modes (e.g., high heat W2, low heat W1, high cool Y2, low cool Y1). The number of taps of the motor 108 may vary depending on, for example, the particular HVAC system and/or the installation environment of the HVAC system. In one exemplary embodiment, the motor 108 is a Regal-Beloit ECM. In another example embodiment, the motor 108 is a Broad-Ocean ECM. It should be understood, however, that various embodiments are possible in which other suitable motors are used.

Figure 2:
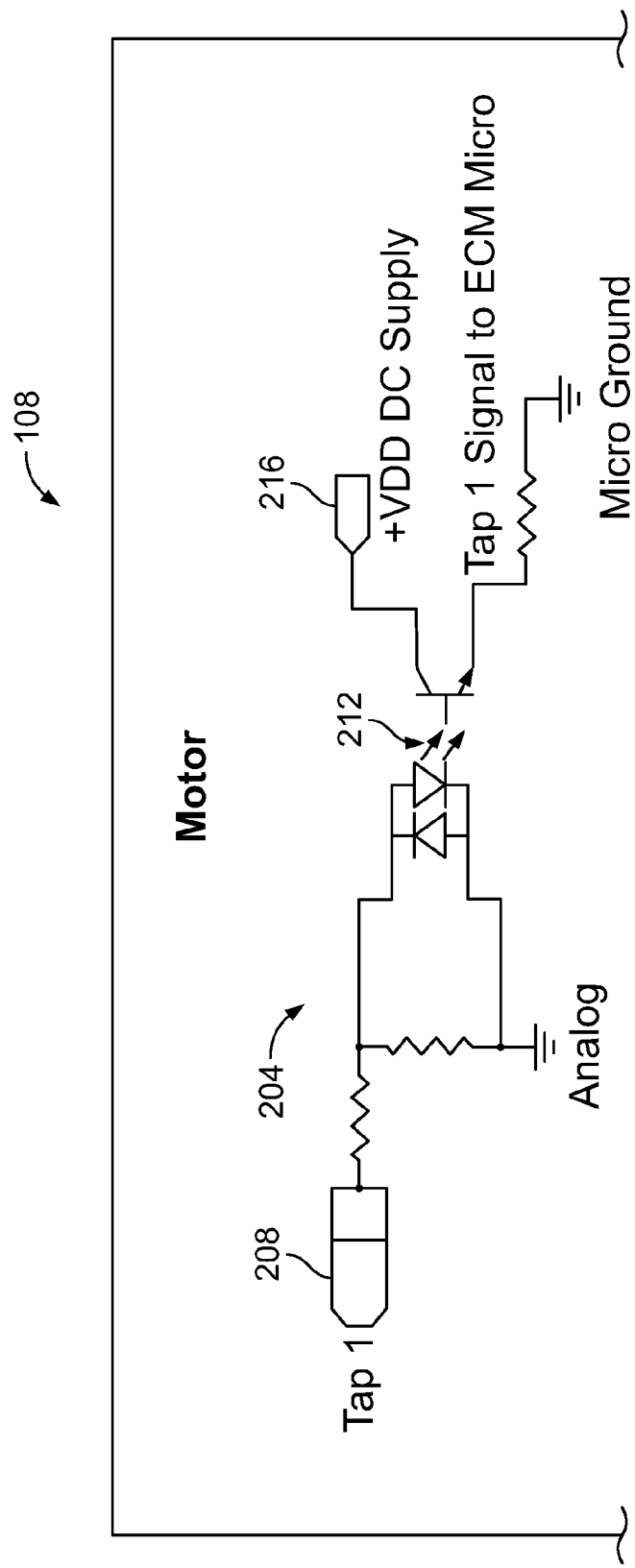
FIG. 2 is a diagram of part of an example motor.

In ECMs, input from a speed tap is typically tied to an input circuit through an opto-isolator and is sent to a microprocessor. The microprocessor interprets the signals from the speed tap and operates the motor at the selected speed. The example motor 108 is partially shown in FIG. 2. An input circuit 204 is provided for a motor tap 208. Although only one tap 208 and input circuit 204 are shown in FIG. 2, the example motor 108 has a plurality of, e.g., five, taps 208, each having a corresponding input circuit 204. Each input circuit 204 is coupled to a motor microcontroller (not shown). The tap 208 is configured to be coupled to and receive control input from the example control interface circuit 112 (shown in FIG. 1). The input circuit 204 includes an opto-isolator 212. A DC voltage source 216 is coupled to the opto-isolator 212.

The input circuit 204 is configured such that if a direct current (DC) signal is applied at the tap 208, the input circuit 204 applies a corresponding control signal to the motor microcontroller. In response to the control signal, the motor microcontroller operates the motor 108. In this example embodiment, each tap 208 corresponds to a different operating parameter of the motor 108 (e.g., speed, torque, etc.). For example, the motor 108 may operate at a first speed when one tap 208 is activated and a second different speed when another tap (not shown in FIG. 2) is activated. In various embodiments, the control interface circuit 112 provides a control interface voltage that is suitable not only for driving the motor 108 but also for driving other motor(s) having interface voltage range(s) different from that of the motor 108.

Figure 3:
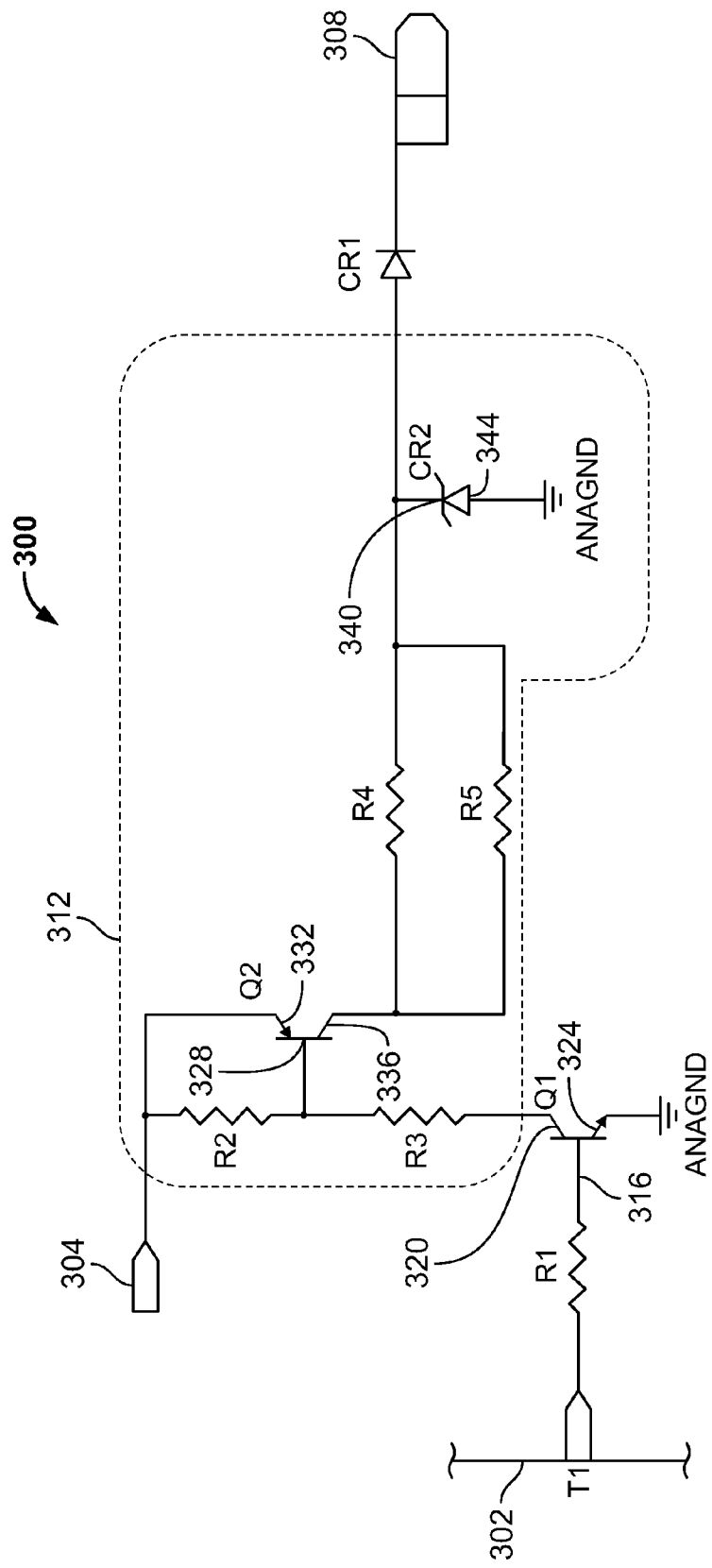
FIG. 3 is a diagram of an example motor control interface circuit in accordance with various embodiments of the disclosure.

FIG. 3 illustrates another example embodiment of a motor control interface circuit 300. The control interface circuit 300 includes a solid-state switching device Q1 controllable by a control device 302 to switch a DC voltage from a DC voltage source 304 to provide a signal, e.g., to a motor tap 308. A normalizing circuit 312 is provided between the DC voltage source 304 and the tap 308. The normalizing circuit 312 has a clamping device CR2 configured to limit a voltage of the signal provided at the tap 308 to an interface voltage level predefined for driving a plurality of motor types having different interface voltage ranges. In the present example embodiment, the switching device Q1 is a NPN transistor, although other or additional solid-state switching devices, e.g., PNP transistor(s), JFET(s), MOSFET(s), combinations of solid-state switching devices, etc., could be used in other embodiments.

A base 316 of the switching device Q1 is configured to receive a control signal via a signal input T1 from the control device 302, e.g., a microcomputer configured to control the switching device Q1, e.g., in accordance with signals from a HVAC system thermostat and/or control board. A resistor R1 is connected between the signal input T1 and the base 316 of the switching device Q1. A collector 320 of the switching device Q1 is connected with the DC voltage source 304 through resistances R2 and R3 of the normalizing circuit 312. An emitter 324 of the switching device Q1 is connected with an analog ground ANAGND.

The normalizing circuit 312 includes another solid-state switching device Q2, which in the present example embodiment is a PNP transistor. Other or additional solid-state switching devices, e.g., NPN transistor(s), JFET(s), MOSFET(s), combinations of solid-state switching devices, etc., could be used in other embodiments. A base 328 of the switching device Q2 is connected between the resistances R2 and R3. An emitter 332 of the switching device Q2 is connected to the DC voltage source 304. A collector 336 of the switching device Q2 is connected with the tap 308 through parallel resistances R4 and R5 and through a diode CR1.

In the present example embodiment, the clamping device CR2 is a Zener diode, although other or additional devices could be used in other embodiments to limit voltage at the tap 308. A cathode 340 of the clamping device CR2 is connected with the Q2 collector 336 through the parallel resistances R4 and R5. An anode 344 of the clamping device CR2 is connected with the analog ground ANAGND.

In the present example embodiment, the DC voltage source 304 provides between 25 and 42 VDC, which may be different from the interface voltage range of a given motor connected with the motor control interface circuit 300. As previously mentioned, the clamping device CR2 is configured to limit a voltage of the signal provided at the tap 308 to an interface voltage level predefined for driving a plurality of motor types having different interface voltage ranges. In the present example embodiment, the clamping device CR2 is a 27-volt Zener diode. When the motor control interface circuit 300 is in operation, there is no current flow from the DC voltage source 304 when a low signal (or no signal) is received at the input T1. When a high signal is received at the input T1, the switching device Q1 becomes activated. Current flows from the DC voltage source 304 through the Q1 collector 320 and emitter 324 to the analog ground ANAGND. The switching device Q2 also becomes activated, and current flows through the Q2 base 328 toward analog ground ANAGND. Current through the switching device Q2 emitter 332 and collector 336 flows through the parallel resistances R4 and R5 toward the tap 308. Operation of the clamping device CR2 at its knee voltage serves to limit the voltage at the tap 308. In the present example embodiment, when voltage at the clamping device CR2 reaches 27 VDC, current from the DC voltage source 304 flows through the clamping device CR2 to the analog ground ANAGND. The voltage level at the tap 308 is thereby kept at 27 VDC, minus a small voltage drop across the diode CR1.

The following component values for the example motor control interface circuit 300 may be used:

R1—4.7 kΩ
R2, R3—10 kΩ
R4, R5—2 kΩ
Q1—MMBTA06L from Fairchild Semiconductor
Q2—MMBTA56L from Fairchild Semiconductor
CR2—27V MMSZ27T1 from ON Semiconductor Of course, other or additional components and/or component values may be used, e.g., in relation to other voltage input ranges, to normalize output voltage to other values for various motor types, etc.

Figure 4:
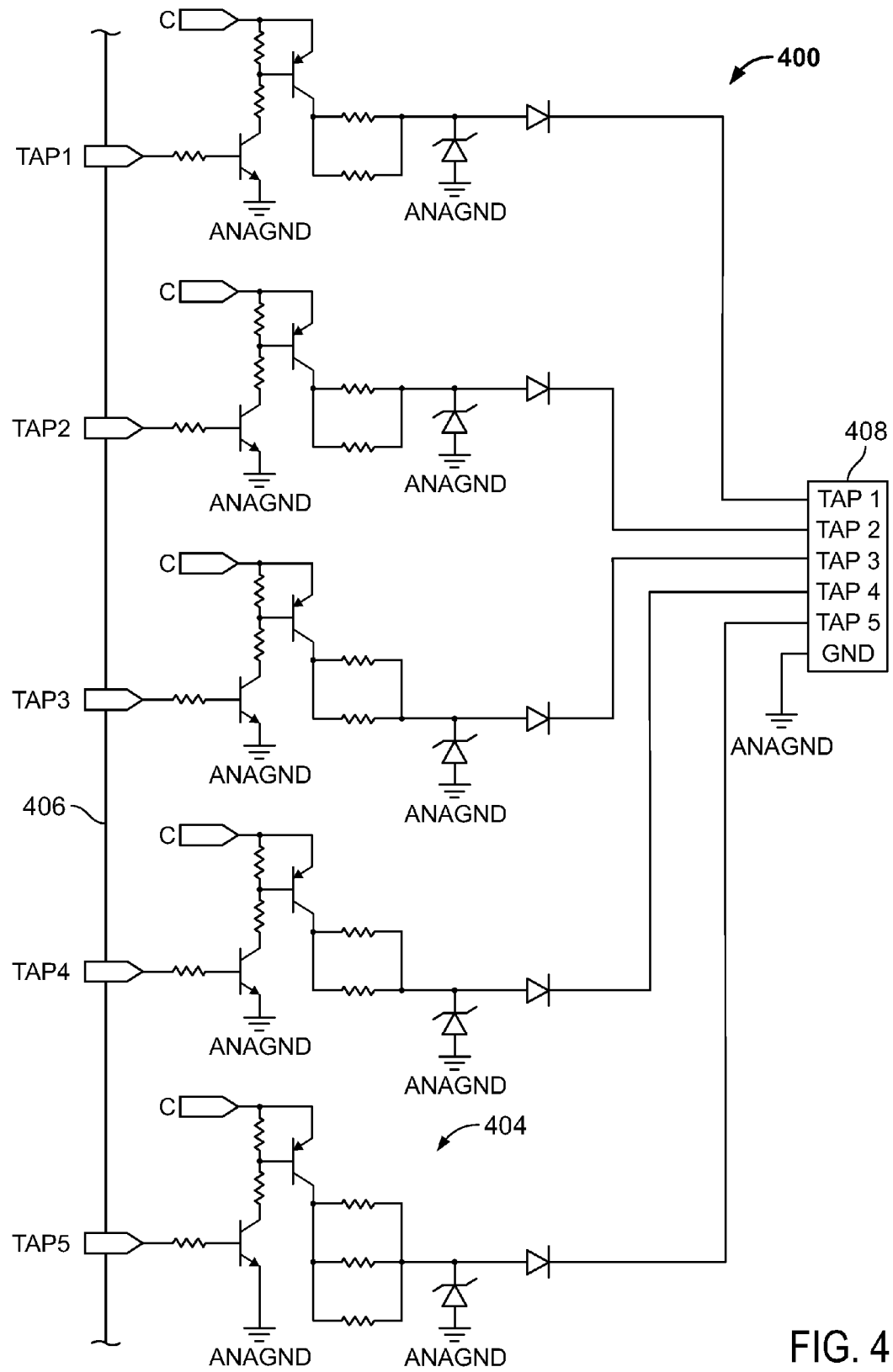
FIG. 4 is a diagram of an example motor control interface circuit assembly in accordance with various embodiments of the disclosure.

An example motor control interface circuit assembly is indicated generally in FIG. 4 by reference number 400. The assembly 400 provides a plurality of, e.g., five, motor control interface circuits 404 controlled by a control device 406 and that interface with a motor tap connector assembly 408. In the present example embodiment, the five motor control interface circuits 404 provide five input signals to five taps (TAP1 through TAP5) of a motor, e.g., a Broad-Ocean ECM. Thus each motor tap has a corresponding motor control interface circuit 404.

In some other embodiments, an interface circuit assembly may have a number of motor control interface circuits that does not correspond to the number of taps of a motor controlled through the interface circuit assembly. For example, and referring to FIG. 3, the control device 302 may be configured to send signals to the control interface circuit 300 for delivery to more than one tap 308 of a given motor. Specifically and for example, the control device 302 may send to the control interface circuit 300 a first signal that corresponds to a first motor tap, and/or may send a second signal, to the same control interface circuit 300, that corresponds to a second motor tap. The control interface circuit 300 may send either signal to the same tap of the motor. In one example embodiment, the motor is configured to receive the first and/or second signal at the same tap, and a microprocessor of the motor is configured to associate the first signal with a first tap and to associate the second signal with a second tap, e.g., as described in U.S. Pat. No. 9,178,447. One such motor is a Regal-Beloit ECM, which accepts five different tap signals via three opto-isolators. Thus, in various embodiments, an HVAC system motor could have any suitable number of input taps, and instances of the control interface circuit 300 could be provided that correspond to all taps, or to fewer than all taps, of the motor. In various embodiments, control interface circuits and/or control interface circuit assemblies may be provided separately from a motor, which may make it possible to retrofit existing motors with such embodiments.

Various embodiments of the foregoing control interface circuits and/or control interface circuit assemblies make it possible to use the same interface circuit with more than one type of motor, including but not necessarily limited to Regal-Beloit ECMs and Broad-Ocean ECMs. Embodiments of the foregoing control interface circuit may provide additional advantages over conventional circuits, e.g., reduction of heat dissipation, improvement in driving capability through the use of two sold-state switches, and lower cost than would be the case for circuits in which relays are used.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A motor control interface circuit comprising:
a first solid-state switching device controllable with an input signal to switch a DC voltage from a DC voltage source to provide a signal; and
a normalizing circuit provided between the DC voltage source and a tap of a motor, the normalizing circuit comprising:
a clamping device configured to limit a voltage of the signal to an interface voltage level predefined for driving a plurality of motor types including the motor; and
a second solid-state switching device between the DC voltage source and the clamping device, the first solid-state switching device controllable to switch the second solid-state switching device on and/or off with the DC voltage;
wherein the normalizing circuit is configured to:
divide current resulting from the switched DC voltage between the first and the second solid-state switching device;
direct a first portion of the divided current passing through a collector and an emitter of the first solid-state switching device to a ground; and
direct a second portion of the divided current passing through an emitter and collector of the second solid-state switching device towards the clamping device.

2. The motor control interface circuit of claim 1, wherein the normalizing circuit further comprises one or more resistances between the second solid-state switching device and the clamping device.

3. The motor control interface circuit of claim 1, wherein the second solid-state switching device comprises a PNP transistor having a base connected between the DC voltage source and the first solid-state switching device.

4. The motor control interface circuit of claim 3, wherein the normalizing circuit further comprises resistances between the DC voltage source and a collector of the first solid-state switching device, the PNP transistor base being connected between the resistances.

5. The motor control interface circuit of claim 1, wherein the first solid-state switching device is configured to pass current to a ground, and the clamping device comprises a Zener diode configured to pass current to the ground.

6. The motor control interface circuit of claim 1, wherein the first solid-state switching device comprises a NPN transistor having a base through which the NPN transistor is controllable to switch the DC voltage.

7. A motor control interface circuit comprising:
a first transistor controllable with an input signal to switch a DC voltage from a DC voltage source to provide a signal; and
a normalizing circuit provided between the DC voltage source and a tap of a motor, the normalizing circuit having a second transistor between the DC voltage source and a clamping device, the first transistor controllable to switch the second transistor on and/or off with the DC voltage;

wherein the clamping device is configured to limit a voltage of the signal to an interface voltage level predefined for driving a plurality of motor types including the motor;

wherein the normalizing circuit is configured to:
  divide current resulting from the switched DC voltage between the first transistor and the second transistor;
  direct a first portion of the divided current passing through a collector and emitter of the first transistor to a ground; and
  direct a second portion of the divided current passing through an emitter and collector of the second transistor towards the clamping device.

8. The motor control interface circuit of claim 7, wherein the clamping device comprises a Zener diode.

9. The motor control interface circuit of claim 8, wherein the normalizing circuit further comprises at least one resistance connected in series with a collector of the second transistor and a cathode of the Zener diode.

10. A motor control interface circuit assembly comprising the motor control interface circuit of claim 7.

11. The motor control interface circuit of claim 7, wherein the plurality of motor types comprise ECMs.

12. A method of driving a motor, the method comprising the steps of:
  switching a DC voltage from a DC voltage source to provide a control signal, the switching performed by an HVAC control device using a first solid-state switching device of a motor control interface circuit;
  normalizing the control signal to a voltage level predefined for driving a plurality of motor types including the motor, the normalizing performed by a normalizing circuit of the motor control interface circuit; and
  providing the normalized control signal at a tap of the motor;

wherein normalizing the control signal comprises:
  dividing current resulting from the switched DC voltage between the first and a second solid-state switching device;
  directing a first portion of the divided current passing through a collector and emitter of the first solid-state switching device to a ground; and
  directing a second portion of the divided current passing through an emitter and collector of the second solid-state switching device towards a clamping device connected with the tap of the motor;
  whereby the clamping device passes current to the ground to limit the voltage of the control signal to the tap of the motor.

13. The method of claim 12, wherein the clamping device includes a Zener diode, the first solid-state switching device includes a NPN transistor, and the second solid-state switching device includes a PNP transistor.

14. The method of claim 12, wherein the normalized control signal at the tap of the motor is configured by the HVAC control device for delivery to another tap of the motor.

15. The method of claim 14, wherein the motor has five taps, and wherein the method is performed as to the motor having five taps.

16. The method of claim 12, performed via a plurality of motor control interface circuits each connected with a corresponding tap of the motor.

17. The method of claim 16, wherein the motor has five taps, and wherein the method is performed as to the motor having five taps.

* * * * *